(12) United States Patent
Kakuta et al.

(10) Patent No.: US 12,298,231 B2
(45) Date of Patent: *May 13, 2025

(54) FLUORESCENT SPECTRUM CORRECTING METHOD AND FLUORESCENT SPECTRUM MEASURING DEVICE

(71) Applicant: SONY GROUP CORPORATION, Tokyo (JP)

(72) Inventors: Masaya Kakuta, Tokyo (JP); Koji Futamura, Kanagawa (JP); Yoshitsugu Sakai, Kanagawa (JP); Yasunobu Kato, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/349,234

(22) Filed: Jul. 10, 2023

(65) Prior Publication Data

US 2023/0349819 A1    Nov. 2, 2023

Related U.S. Application Data

(63) Continuation of application No. 17/897,916, filed on Aug. 29, 2022, now Pat. No. 11,726,031, which is a
(Continued)

(30) Foreign Application Priority Data

Nov. 11, 2010   (JP) .................................. 2010-252863

(51) Int. Cl.
*G01N 21/27*        (2006.01)
*G01N 15/1429*      (2024.01)
(Continued)

(52) U.S. Cl.
CPC ....... *G01N 21/274* (2013.01); *G01N 15/1429* (2013.01); *G01N 21/6428* (2013.01); *G01N 15/01* (2024.01)

(58) Field of Classification Search
CPC ............. G01N 21/274; G01N 15/1429; G01N 21/6428
(Continued)

(56) References Cited

U.S. PATENT DOCUMENTS 6,201,241 B1    3/2001  Koike
7,426,026 B2    9/2008  Matsumoto et al.
(Continued)

FOREIGN PATENT DOCUMENTS

EP         2204643 A1 *  7/2010  ........... G01N 15/147
JP     2005-181276 A     7/2005
(Continued)

OTHER PUBLICATIONS

Hiromitsu Nakauchi, "Cell Engineering Additional Volume Experiment Protocol Series Flow Cytometry Freely", Second Edition, Shujunsha Co Ltd., Aug. 31, 2006.
(Continued)

*Primary Examiner* — Ricky Go
(74) *Attorney, Agent, or Firm* — CHIP LAW GROUP

(57) ABSTRACT

A fluorescent spectrum correcting method includes comparing fluorescent spectrum obtained from micro-particles labeled with a plurality of fluorescent pigments with reference spectrum to separating the fluorescent spectrum into
(Continued)

fluorescent spectrum for each pigment, and previously measured spectrum data is used as the reference spectrum.

19 Claims, 13 Drawing Sheets

Related U.S. Application Data continuation of application No. 17/142,632, filed on Jan. 6, 2021, now Pat. No. 11,454,588, which is a continuation of application No. 16/100,884, filed on Aug. 10, 2018, now Pat. No. 10,908,075, which is a continuation of application No. 13/287,459, filed on Nov. 2, 2011, now abandoned.

(51) Int. Cl.
  *G01N 21/64* (2006.01)
  *G01N 15/01* (2024.01)
(58) Field of Classification Search
  USPC .................................................. 702/104
  See application file for complete search history.

(56) References Cited

U.S. PATENT DOCUMENTS

| | | | |
|---|---|---|---|
| 8,649,008 | B2 | 2/2014 | Kashani et al. |
| 2002/0125136 | A1 | 9/2002 | Sharaf et al. |
| 2002/0142340 | A1* | 10/2002 | Waggoner ............... C09B 23/02 |
| | | | 435/7.1 |
| 2002/0165684 | A1 | 11/2002 | Olson |
| 2004/0087032 | A1 | 5/2004 | Chandler et al. |
| 2005/0019842 | A1 | 1/2005 | Prober et al. |
| 2005/0046835 | A1 | 3/2005 | Olschewski |
| 2005/0260766 | A1 | 11/2005 | Paul et al. |
| 2006/0200318 | A1 | 9/2006 | Morishita et al. |
| 2007/0098594 | A1 | 5/2007 | Elkin et al. |
| 2008/0186448 | A1* | 8/2008 | Ishak ..................... G02C 7/108 |
| | | | 351/159.6 |
| 2009/0012721 | A1 | 1/2009 | Kimura et al. |
| 2010/0070904 | A1 | 3/2010 | Zigon et al. |
| 2010/0241360 | A1 | 9/2010 | Calvin et al. |
| 2010/0261965 | A1 | 10/2010 | Beck et al. |
| 2011/0098962 | A1 | 4/2011 | Iguchi et al. |
| 2011/0153226 | A1 | 6/2011 | Dasaratha et al. |
| 2011/0267352 | A1* | 11/2011 | Sakai ................... G06T 11/206 |
| | | | 345/440 |
| 2012/0296570 | A1 | 11/2012 | Merchez et al. |

FOREIGN PATENT DOCUMENTS

| | | |
|---|---|---|
| JP | 2005-181726 A | 7/2005 |
| JP | 2005-195586 A | 7/2005 |
| JP | 2006-230333 A | 9/2006 |
| JP | 2008-500558 A | 1/2008 |
| JP | 2009-109197 A | 5/2009 |
| JP | 2009-109218 A | 5/2009 |
| JP | 2009-115672 A | 5/2009 |
| JP | 2009-162667 A | 7/2009 |

OTHER PUBLICATIONS

Advisory Action for U.S. Appl. No. 13/287,459, issued on Aug. 9, 2018, 03 pages.
Final Office Action for U.S. Appl. No. 13/287,459, issued on May 3, 2018, 12 pages.
Non-Final Office Action for U.S. Appl. No. 13/287,459, issued on Nov. 29, 2017, 11 pages.
Advisory Action for U.S. Appl. No. 13/287,459, issued on Sep. 29, 2017, 03 pages.
Final Office Action for U.S. Appl. No. 13/287,459, issued on Jul. 14, 2017, 09 pages.
Non-Final Office Action for U.S. Appl. No. 13/287,459, issued on Mar. 10, 2017, 07 pages.
Avisory Action for U.S. Appl. No. 13/287,459, issued on Dec. 30, 2016, 03 pages.
Final Office Action for U.S. Appl. No. 13/287,459, issued on Sep. 27, 2016, 14 pages.
Non-Final Office Action for U.S. Appl. No. 13/287,459, issued on Mar. 15, 2016, 14 pages.
Advisory Action for U.S. Appl. No. 13/287,459, issued on Feb. 17, 2016, 06 pages.
Final Office Action for U.S. Appl. No. 13/287,459, issued on Nov. 24, 2015, 13 pages.
Non-Final Office Action for U.S. Appl. No. 13/287,459, issued on May 21, 2015, 14 pages.
Advisory Action for U.S. Appl. No. 13/287,459, issued on Apr. 7, 2015, 03 pages.
Final Office Action for U.S. Appl. No. 13/287,459, issued on Feb. 3, 2015, 12 pages.
Non-Final Office Action for U.S. Appl. No. 13/287,459, issued on Nov. 18, 2014, 09 pages.
Non-Final Office Action for U.S. Appl. No. 13/287,459, issued on Apr. 28, 2014, 10 pages.
Non-Final Office Action for U.S. Appl. No. 16/100,884, issued on Sep. 21, 2018, 14 pages.
Non-Final Office Action for U.S. Appl. No. 16/100,884, issued on Oct. 1, 2019, 12 pages.
Final Office Action for U.S. Appl. No. 16/100,884, issued on May 30, 2019, 11 pages.
Final Office Action for U.S. Appl. No. 16/100,884, issued on Jun. 12, 2020, 14 pages.
Advisory Action for U.S. Appl. No. 16/100,884, issued on Aug. 9, 2019, 03 pages.
Advisory Action for U.S. Appl. No. 16/100,884, issued on Jul. 28, 2020, 07 pages.
Notice of Allowance for U.S. Appl. No. 16/100,884, issued on Oct. 5, 2020, 08 pages.
Notice of Allowance for U.S. Appl. No. 17/142,632, issued on May 23, 2022, 08 pages.
Non-Final Office Action for U.S. Appl. No. 17/142,632, issued on Jan. 21, 2022, 12 pages.
Notice of Allowance for U.S. Appl. No. 17/897,916, issued on Mar. 30, 2023, 08 pages.
Non-Final Office Action for U.S. Appl. No. 17/897,916, issued on Dec. 22, 2022, 08 pages.

* cited by examiner

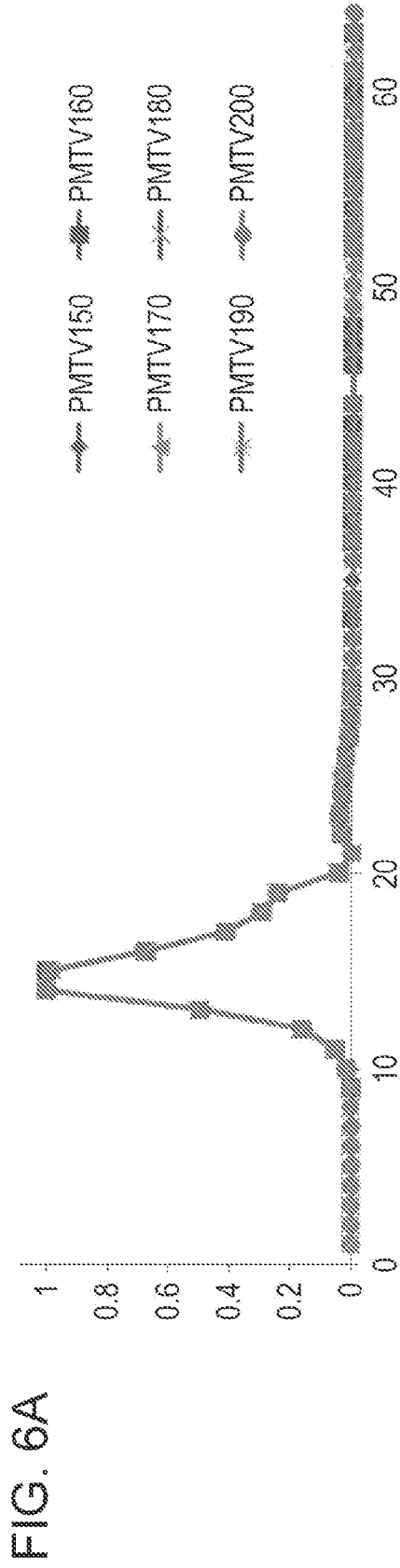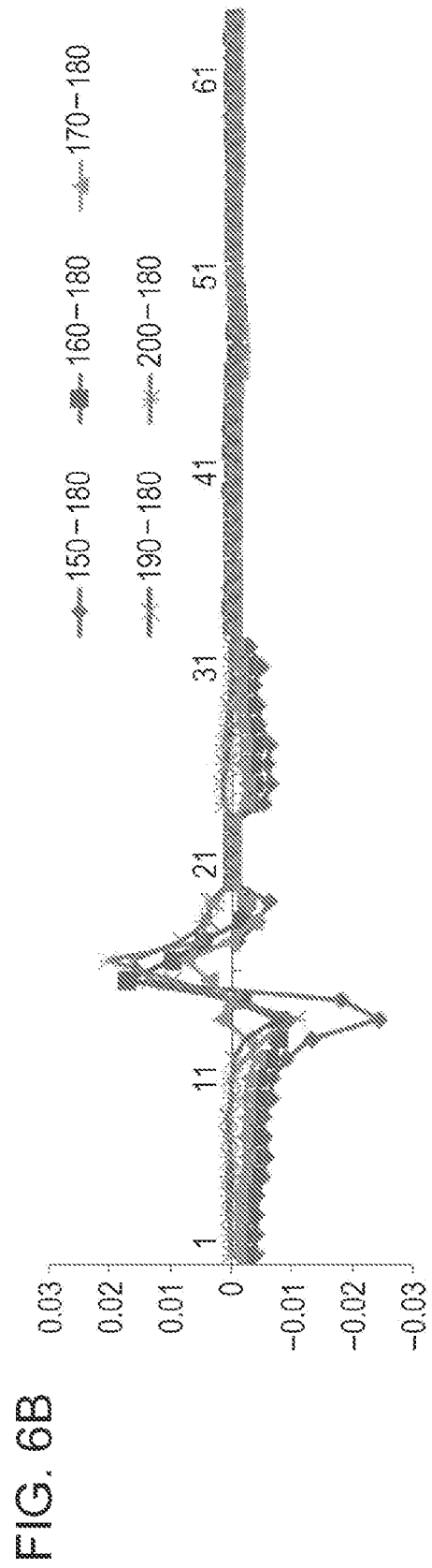
FIG. 6A
FIG. 6B

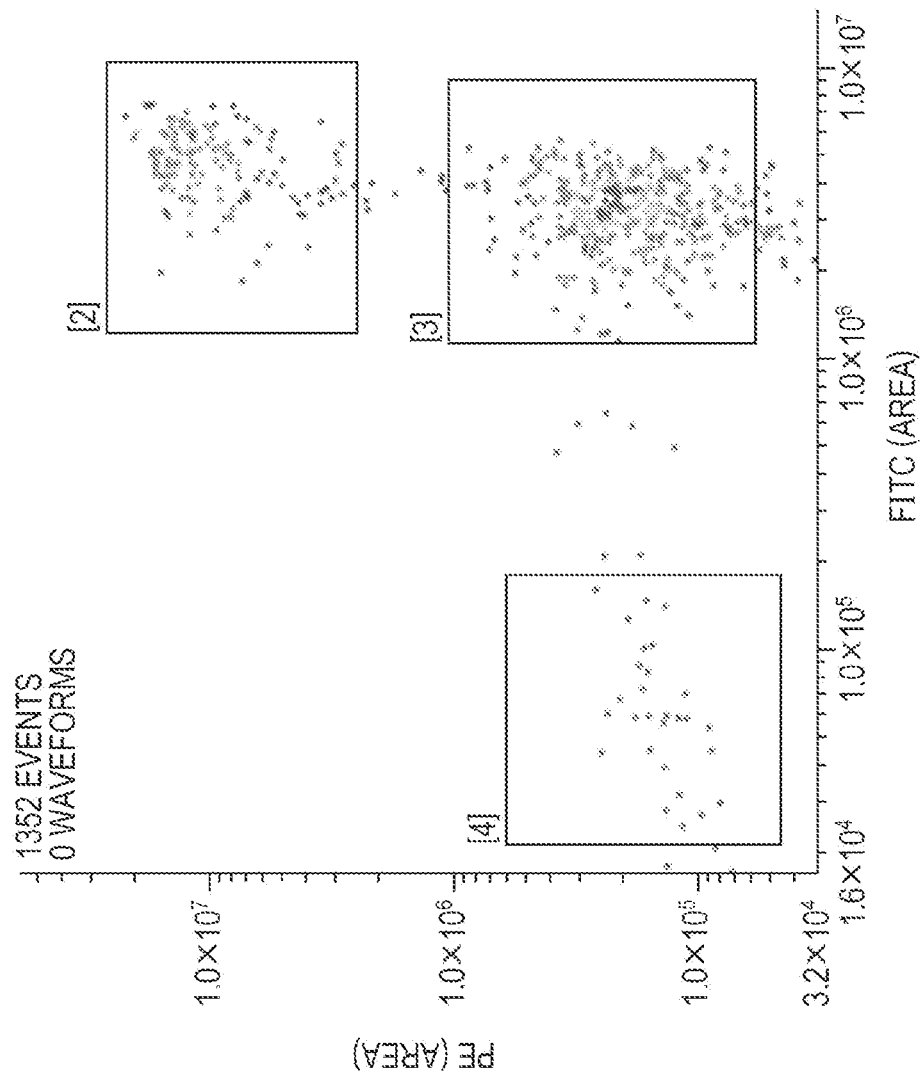

FLUORESCENT SPECTRUM CORRECTING METHOD AND FLUORESCENT SPECTRUM MEASURING DEVICE

CROSS-REFERENCE PARAGRAPH

The present application is a continuation application of U.S. patent application Ser. No. 17/897,916, filed Aug. 29, 2022, which is a continuation application of U.S. patent application Ser. No. 17/142,632, filed Jan. 6, 2021, (now U.S. Pat. No. 11,454,588), which is a continuation application of U.S. patent application Ser. No. 16/100,884, filed Aug. 10, 2018, (now U.S. Pat. No. 10,908,075), which is a continuation application of U.S. patent application Ser. No. 13/287,459, filed Nov. 2, 2011, which claims the benefit of priority from prior Japanese Patent Application JP 2010-252863, filed Nov. 11, 2010, the entire content of which is hereby incorporated by reference. Each of the above-referenced applications is hereby incorporated herein by reference in its entirety.

BACKGROUND

The present disclosure relates to a fluorescent spectrum correcting method and a fluorescent spectrum measuring device. More particularly, the present disclosure relates to a technique for separating the fluorescent spectrum obtained from micro-particles labeled with a plurality of fluorescent pigments, for each pigment.

Generally, when micro-particles such as cells, microorganisms, and liposomes are analyzed, flow cytometry (flow cytometer) is used (e.g., see Hiromitsu Nakauchi Edition, "Cell Engineering Additional Volume Experiment Protocol Series Flow Cytometry Freely", Second Edition, Shujunsha Co., Ltd., Published Aug. 31, 2006). The flow cytometry is a method of irradiating micro-particles flowing in a flow path in one row with laser light (excitement light) of a specific wavelength and detecting fluorescent light or diffused light emitted by the micro-particles to analyze the plurality of micro-particles one by one. In the flow cytometry, the light detected by an optical detector is converted into an electrical signal to be a value and statistical analysis is performed to determine types, sizes, structures, and the like of individual micro-particles.

Recently, in basic medical science and the clinical field, to advance comprehensive analysis, there are many cases of simultaneously using a number of molecular probes. Accordingly, biological knowledge is rapidly accumulated, and understanding of the phenomenon of life is advanced. For this reason, even in the flow cytometry, multi-color analysis using a plurality of fluorescent pigments has come into wide use (e.g., see Japanese Unexamined Patent Application Publication No. 2006-230333 and PCT Japanese Translation Patent Publication No. 2008-500558).

Meanwhile, when a plurality of fluorescent pigments are used in one measurement in the same manner as multi-color analysis, high-sensitivity detectors corresponding to the number of fluorescent pigments are necessary. The light from undesired fluorescent pigments of the detectors is confused, and thus analytical quality control decreases. In the flow cytometer of the related art, since only the desired optical information is taken from the desired fluorescent pigments, mathematical correction, that is, fluorescent correction is performed when the light detected by the optical detector is converted into the electrical signal to be a value.

However, in quite a few fluorescent corrections, since the light detected by the undesired detector is discriminated by eyes of an observer, human error may occur, and thus it may be incorrect. For this reason, the observer has to understand the device and has to be trained to use the device while having knowledge of cells, fluorescent pigments, antibodies, and the like. Therefore, observers have to have highly specialized knowledge.

In the related art, a spectral deconvolution method of previously registering the light emission spectrum of used fluorescent labels in advance in a computer, separating the light emission spectrum of a measurement target into the light emission spectrum of the fluorescent label using the data, and determining an existence ratio of the fluorescent labels is proposed (see Japanese Unexamined Patent Application Publication No. 2005-181276). In spectrum absorption light measurement such as an infrared spectrum method, in the related art, correction or analysis of the measured spectrum is performed on the basis of a standard spectrum or reference spectrum (e.g., see Japanese Unexamined Patent Application Publication Nos. 2005-195586 and 2009-162667).

SUMMARY

However, in the micro-particle analyzing device provided with the plurality of high-sensitivity detectors of the related art, the stray fluorescent light detected by detectors other than the desired detector is a big problem, as well as it being necessary to prepare high-sensitivity detectors corresponding to the number of desired fluorescent pigments. Particularly, in the case of the fluorescent pigments to which the spectrum is close, the fluorescent correction is not performed due to stray fluorescent light.

For this reason, even when a plurality of high-sensitivity detectors are disposed, there is a limit to the number of simultaneously detectable fluorescent pigments in the micro-particle analyzing device of the related art. For example, similarly to the spectrum type flow cytometer, which does not have a plurality of high-sensitivity detectors, a next generation flow cytometer usable under a condition where stray fluorescent light exists is necessary.

As described above, each of the fluorescent pigments has a special spectrum, and the spectrum information represents the characteristics of the fluorescent pigment itself to be important data. However, to accurately estimate the overlap between each spectrum and to perform fluorescent correction with high precision, data of a single stain sample is necessary.

For this reason, a worker has to prepare the single stain sample for each fluorescent pigment, and the work increases according to the increase in the number of pigments used. Accordingly, the burden on the worker increases and work efficiency decreases. The number of operations of fluorescent correction is in proportion to substantially the square of the number of fluorescent pigments used, and it is troublesome to the observer. As a practical problem, the volume of a test target object such as collectible blood is finite, and thus there is a case where it is difficult to produce the single stain sample for each fluorescent pigment.

In the present disclosure, it is desirable to provide a fluorescent spectrum correcting method and a fluorescent spectrum measuring device capable of dissolving the overlap between each spectrum with high precision even when the single stain sample is not prepared for each fluorescent pigment.

According to an embodiment of the present disclosure, there is provided a fluorescent spectrum correcting method including: comparing the fluorescent spectrum obtained from micro-particles labeled with a plurality of fluorescent pigments with a reference spectrum to separate the fluorescent spectrum into a fluorescent spectrum for each pigment, wherein previously measured spectrum data is used as the reference spectrum.

In the correction method, spectrum data in which an error from a single stain sample is equal to or less than 8% may be used as the reference spectrum.

In the correction method, the measurement date, the potential of a detector, the type of coupled antibody, and any spectrum data of a different type of cell when the micro-particles are cells are used as the reference spectrum.

In the correction method, when the micro-particles are cells, fluorescent spectrum data measured using cells may be used as the reference spectrum.

According to another embodiment of the present disclosure, there is provided a fluorescent spectrum measuring device including: a detection unit that simultaneously detects fluorescent light emitted from micro-particles in an arbitrary wavelength region; an analysis unit that separates the data detected by the detection unit into a fluorescent spectrum for each pigment; and a memory unit that stores the fluorescent spectrum data separated by the analysis unit, wherein the analysis unit uses the previously measured fluorescent spectrum data stored in the memory unit as the reference spectrum to perform separation of a fluorescent spectrum.

In the device, the detection unit may be provided with a multi-channel photo-multiplier tube.

According to the embodiments of the present disclosure, since the previously measured fluorescent spectrum data is used, the single stain sample is not necessary, the overlap between each spectrum can be dissolved with high precision, and further the single stain sample is not necessary.

BRIEF DESCRIPTION OF THE DRAWINGS

FIG. 6A is a graph illustrating a relationship between a potential of a detector and a fluorescent spectrum in which the horizontal axis is a channel number (wavelength dependent number) of a detector and the vertical axis is a fluorescent intensity, and FIG. 6B is a graph illustrating an error in each wavelength.

FIG. 10 is an analysis result in which the horizontal axis is data of an antibody CD45RA of a fluorescent pigment FITC and the vertical axis is data of an antibody CD3 of a fluorescent pigment PE.

DETAILED DESCRIPTION OF EMBODIMENTS

Figure 1:
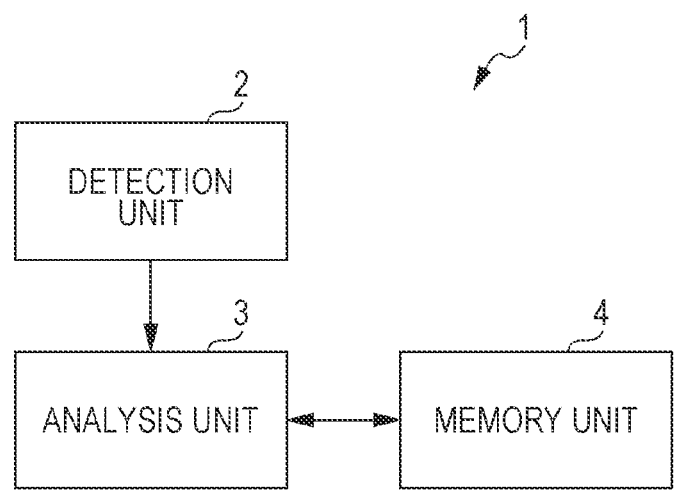
FIG. 1 is a block diagram illustrating a configuration of a fluorescent spectrum measuring device according to a first embodiment of the present disclosure.

Hereinafter, embodiments of the present disclosure will be described in detail with reference to the accompanying drawings. The present disclosure is not limited to the embodiments described below. The description is performed in the following order.

1. First Embodiment

Example of Method of Correcting Fluorescent Spectrum without Using Single Stain Sample 2. Second Embodiment Example of Fluorescent Spectrum Measuring Device without Using Single Stain Sample 1. First Embodiment Correction Method First, a fluorescent spectrum correcting method (hereinafter, merely referred to as a correction method) according to a first embodiment of the present disclosure will be described. In the correction method of the embodiment, previously measured fluorescent spectrum is used as reference spectrum when fluorescent spectrum obtained from micro-particles labeled with a plurality of fluorescent pigments is separated for each pigment.

Herein, the "micro-particles" widely include bionic micro-particles such as cells, microorganisms, and liposomes, or synthetic particles such as latex particles, gel particles, and industrial particles. The bionic micro-particles include chromosomes constituting various cells, liposomes, mitochondria, organelles (cell organelles), and the like. The cells include vegetable cells, animal cells, blood corpuscle cells, and the like. The microorganisms include bacilli such as colon bacilli, viruses such as tobacco mosaic viruses, germs such as yeast, and the like. The bionic micro-particles may include bionic polymers such as hexane, protein, and complexes thereof.

The industrial particles may be formed of, for example, organic polymer materials, inorganic materials, or metal materials. Polystyrene, styrene divinyl benzene, polymethyl methacrylate, and the like may be used as the organic polymer materials. Glass, silica, magnetic materials, and the like may be used as the inorganic materials. For example, gold colloid, aluminum, and the like may be used as the metal materials. The shape of the micro-particles is generally spherical, but may be non-spherical, and the size, mass, and the like are not particularly limited.

In the correction method of the embodiment, in the spectrum data used as the reference spectrum, an error from spectrum of a single stain sample of measurement target micro-particles is preferably 8% or less, and more preferably 3% or less. Accordingly, a matching error from the measurement data is small, and it is possible to perform fluorescent correction with high precision.

Specifically, in the reference spectrum of each pigment, for example, the measurement date, the potential of the detector, the output of laser, the flux of micro-particles, the type of coupled antibodies, or data (fluorescent spectrum) of a different type of cells when the micro-particles are cells may be used. Since such conditions do not have a great influence on the fluorescent spectrum, it is possible to dissolve the overlap with high precision even when such spectrum data is used in the reference spectrum to perform correction.

However, when the micro-particles are cells, the results obtained from the measurement using beads are not used as the reference spectrum, for example, even when they are labeled with the same fluorescent pigment, and the opposite case is the same. As described above, even when there is a difference in type between cells, they may be used as the reference spectrum. Of course, even when there is a difference in type between beads, they may be used as the reference spectrum.

In the correction method of the embodiment, since the spectrum data in which the error from the single stain sample of the previously measured measurement target micro-particles is 8% or less is used as the reference spectrum, it is not necessary to prepare the single stain sample at the stage of measurement. Accordingly, the burden on the worker is reduced, and thus work efficiency is also improved. Even when the amount of a test target object is small like a small animal such as a rat, it is possible to perform analysis without decreasing accuracy.

The fluorescent spectrum correcting method of the embodiment is applicable irrespective of processes before and after it when the method is a method having a process of separating the fluorescent spectrum obtained from the micro-particles labeled with the plurality of fluorescent pigments for each pigment using the reference spectrum.

2. Second Embodiment

Overall Configuration of Device

Next, a fluorescent spectrum measuring device according to a second embodiment of the present disclosure will be described. FIG. 1 is a block diagram illustrating a configuration of the fluorescent spectrum measuring device of the embodiment. As shown in FIG. 1, the fluorescent spectrum measuring device 1 of the embodiment includes at least a detection unit 2, a memory unit 3, and an analysis unit 4, and performs the correction method of the first embodiment. The fluorescent spectrum measuring device 1 shown in FIG. 1 may further include a liquid transmitting unit.

Configuration of Detection Unit 2

The detection unit 2 may have a configuration in which fluorescent light emitted from the analysis target micro-particles can be simultaneously detected in an arbitrary wavelength region. Specifically, a plurality of independent sensors capable of detecting the wavelength region for each wavelength region are disposed, or one or more detectors capable of simultaneously detecting a plurality of light such as a multi-channel photo-multiplier tube (PMT) may be provided. The number of wavelength regions detected by the detector 2, that is, the number of channels or sensors provided in the detector 2 is preferably equal to or more than the number of used pigments.

The fluorescent spectrum measuring device 1 of the embodiment may have a configuration in which the detector 2 is provided with a spectroscope, and the fluorescent light emitted from the micro-particles is dispersed by the spectroscope and then enters a detector such as the multi-channel PMT. The detection unit 2 may be provided with an object lens, a condensing lens, a pinhole, a band cutoff filter, a dichroic mirror, and the like, as necessary.

Configuration of Analysis Unit 3

In the analysis unit 3, the light of each wavelength region detected by the detection unit 2 is quantified to acquire total fluorescent light quantity (intensity) using an electronic calculator or the like. Fluorescent spectrum correction using the reference spectrum is performed as necessary. The result (fluorescent spectrum data) is stored in the memory unit 4.

Configuration of Memory Unit 4

The memory unit 4 stores the fluorescent spectrum data processed by the analysis unit 3. For example, the fluorescent spectrum data of the single stain sample may be stored in the memory unit 4, as well as the previously measured fluorescent spectrum data.

Operation of Fluorescent Spectrum Measuring Device 1

Next, an operation of the fluorescent spectrum measuring device 1 of the embodiment will be described. The micro-particles analyzed by the fluorescent spectrum measuring device 1 of the embodiment are not particularly limited, but may be, for example, cells or micro-beads. The type or number of fluorescent pigments modifying the micro-particles is not particularly limited, but existing pigments such as FITC (fluorescein isothiocynate: $C_{21}H_{11}NO_5S$), PE (phycoerythrin), PerCP (peridinin chlorophyll protein), and PE-Cy5, and PE-Cy7 may be appropriately selected and used as necessary. The micro-particles may be modified by the plurality of fluorescent pigments.

When the micro-particles are optically analyzed using the fluorescent spectrum measuring device 1 of the embodiment, first, excitement light is output from a light source and the micro-particles flowing in a flow path are irradiated with the excitement light. Then, the fluorescent light output from the micro-particles is detected by the detection unit 2. Specifically, only light (desired fluorescent light) of a specific wavelength is separated from the light output from the micro-particles using a dichroic mirror, a band pass filter, or the like, and the light is detected by a detector such as a 32-channel PMT. In this case, the fluorescent light is dispersed using, for example, a spectroscope, and light of different wavelengths is detected in each channel of the detector. Accordingly, it is possible to obtain the spectrum information of the detection light (fluorescent light).

Thereafter, the information of several detectors acquired in the detection unit 2 are converted into digital signals in, for example, a conversion unit (not shown), and is further quantified in the analysis unit 3. At that time, the fluorescent correction is performed using the previously measured fluorescent spectrum data stored in the memory unit 4 as the reference spectrum. Specifically, in the reference spectrum of each pigment, fluorescent spectrum data in which an error from the spectrum of the single stain sample of the micro-particles is 8% or less is used, for example, measurement date, potential of the detector, type of coupled antibody, or different type of cells when the micro-particles are cells. The fluorescent spectrum data after correction is stored in the memory unit 4.

In the fluorescent spectrum measuring device of the present disclosure, since the spectrum data in which the error from the spectrum of the single stain sample of the measurement target micro-particles is 8% or less is used as the reference spectrum, it is possible to perform the correction with high precision even when the single stain sample is not used. The fluorescent spectrum data that is the reference spectrum is sequentially accumulated in the memory unit 4, and thus it is possible to construct a database suitable for a real use situation.

Particularly, when a cell is used as a sample, there is a case where it is difficult to avoid the change of the potential of the detector and the laser output. In such a case, in the device of the related art, it is necessary to perform the correction again to take the consistency of the fluorescent correction. However, in the fluorescent spectrum device of the embodiment, it is not necessary to do.

Example

Hereinafter, advantages of the present disclosure will be described in detail with reference to an example of the present disclosure. In the example, the measurement data, the potential of the detector, the type of coupled antibody, and the type of micro-particles were changed, the fluorescent spectrum was compared, and the difference thereof was examined.

In the Example, an Immuno-TROL (made by Beckman Coulter, Co., Ltd.) or a Multi-Check (made by Becton Dickinson, Co., Ltd.) available on the market as a precision managing cell was used as a sample. They are positive process controls for flow cytometry (whole blood control examination target object), and represent diffused light, distribution of cell groups, fluorescent intensity, and antigen density since a positive rate of a particular surface antigen and an absolute number are calibrated in a monocyte. A product available on the market (made by made by Beckman Coulter, Co., Ltd. or Becton Dickinson, Co., Ltd.) was used as an antibody labeled with a fluorescent pigment.

Dyeing of the sample was performed according to a titration method. Specifically, the temperature of the sample was kept at room temperature, then the antibody labeled with the desired fluorescent pigment was dropped into a dedicated plastic tube, blood of 50 μL was dropped therein to be smoothly infiltrated, and the antibody and the cell were made to react. It was left for 20 minutes at a dark place at room temperature. Then, a hemolytic agent (FACS Lyse solution: ammonium chloride solution, Beckman Coulter, Co., Ltd.) of 1 ml was dropped into it. Accordingly, red blood corpuscles were hemolyzed, granulocyte, monocyte, and lymphocyte remain. It was centrifuged and washed by an appropriate solution, and thus a high purity sample solution was obtained.

In the measurement, the cell solution (sample solution) adjusted by the method described above was introduced into a special measurement cell for cell analysis formed of plastic, 3-dimensional focus was performed by a sheath solution for flow cytometer, and then it was irradiated with the excitement light. Laser beams with wavelengths of 488 nm and 640 nm were used as an excitement source. The fluorescent light emitted from each cell was dispersed by a prism spectroscope or the like, and then was detected by the 32ch PMT. In the example, the 32ch PMT was used as the detector, but two laser beams were used as the excitement light. Accordingly, the spectrum data of 64 channels as the amount of information were transmitted to the analysis unit and the memory unit.

Daily Difference

Figure 2A:
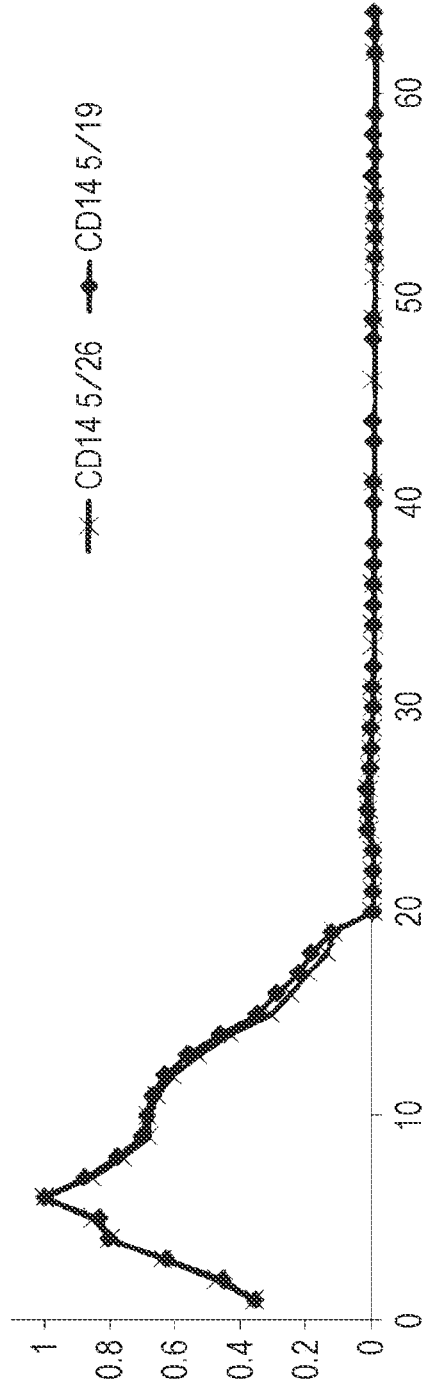
FIG. 2A is a graph illustrating a relationship between a measurement date and fluorescent spectrum in which a horizontal axis is a channel number of a detector and a vertical axis is a fluorescent intensity.
Figure 2B:
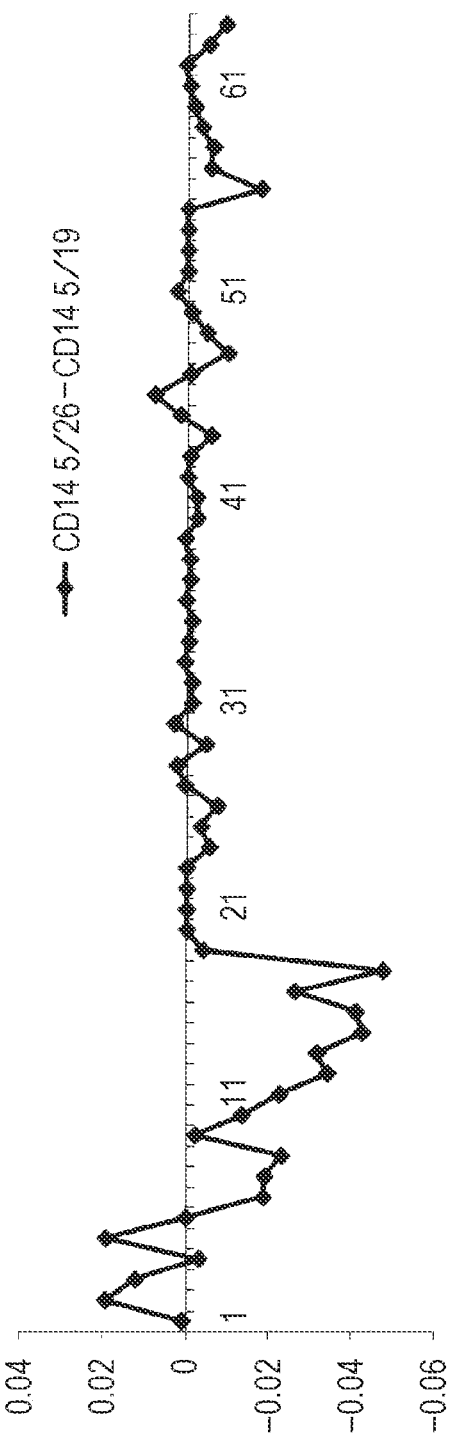
FIG. 2B is a graph illustrating an error in each wavelength (FITC: CD14).
Figure 3A:
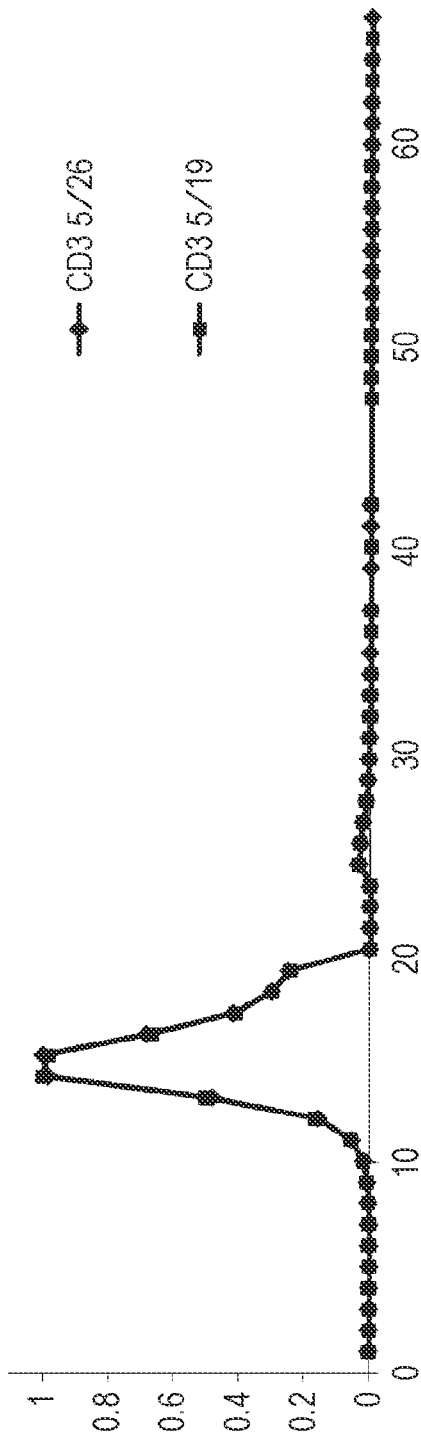
FIG. 3A is a graph illustrating a relationship between a measurement date and a fluorescent spectrum in which the horizontal axis is a channel number of a detector and the vertical axis is a fluorescent intensity.
Figure 3B:
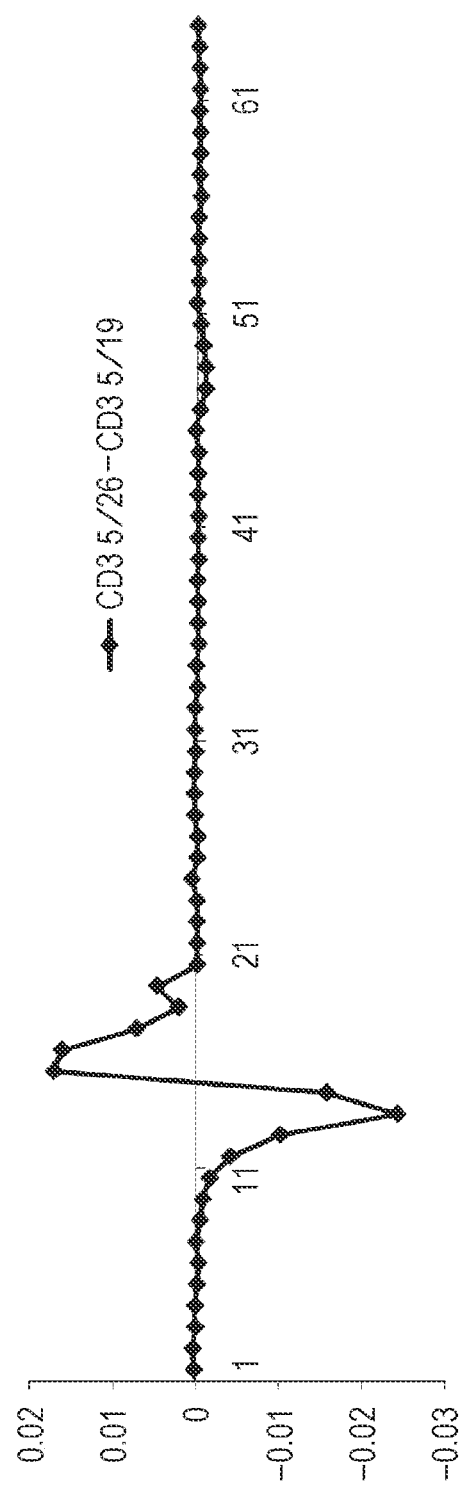
FIG. 3B is a graph illustrating an error in each wavelength (PE: CD3).

FIGS. 2A, 3A, 4A, and 5A are graphs in which the horizontal axis is a channel number (wavelength dependent number) of the detector and the vertical axis is fluorescent intensity, and FIGS. 2B, 3B, 4B, and 5B are graphs illustrating an error in each wavelength. The florescent spectrum shown in FIGS. 2A and 2B is data measured using FITC as the florescent pigment and CD14 as the antibody, the florescent spectrum shown in FIGS. 3A and 3B is data measured using PE as the florescent pigment and CD3 as the antibody. The same lot was used at any date.

Figure 4A:
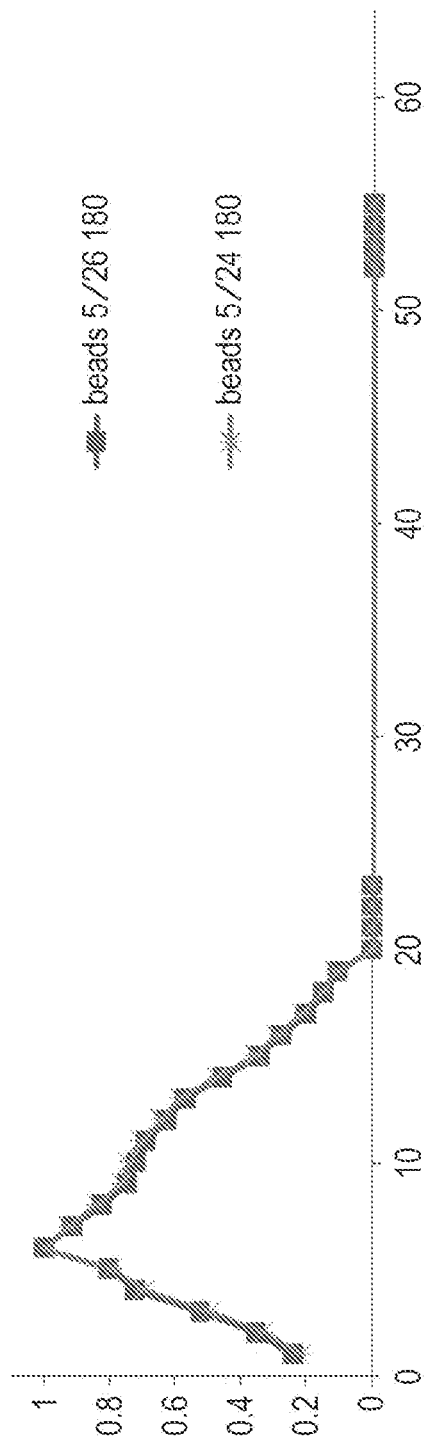
FIG. 4A is a graph illustrating a relationship between a measurement date and a fluorescent spectrum in which the horizontal axis is a channel number of a detector and the vertical axis is a fluorescent intensity.
Figure 4B:
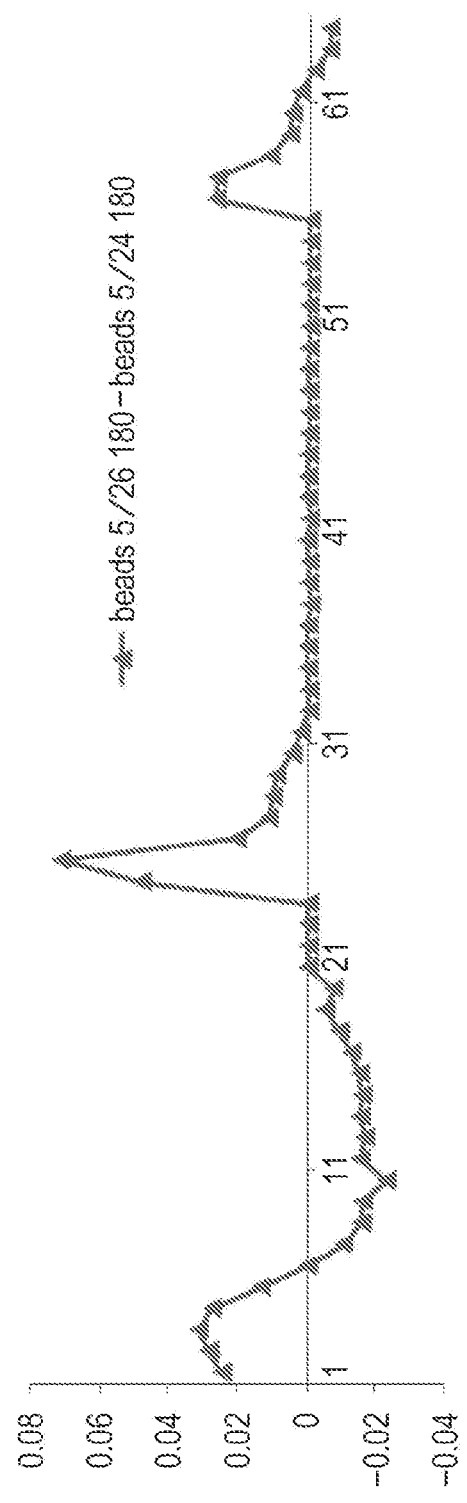
FIG. 4B is a graph illustrating an error in each wavelength (spectrum corresponding to FITC of BD 7-Color Setup Beads).
Figure 5A:
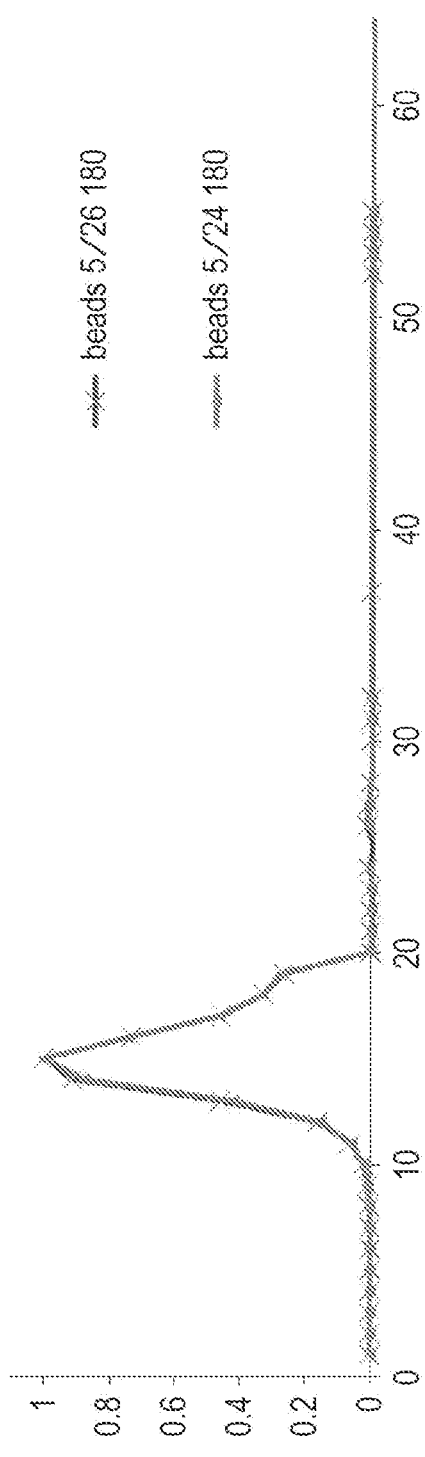
FIG. 5A is a graph illustrating a relationship between a measurement date and a fluorescent spectrum in which the horizontal axis is a channel number of a detector and the vertical axis is a fluorescent intensity.
Figure 5B:
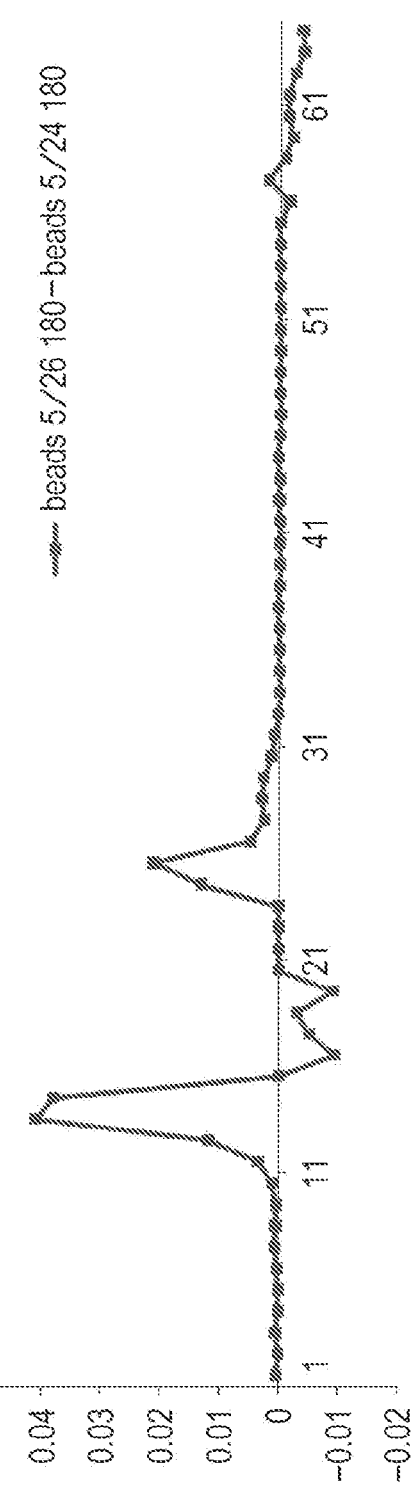
FIG. 5B is a graph illustrating an error in each wavelength (spectrum corresponding to PE of BD 7-Color Setup Beads).

FIGS. 4A and 4B are fluorescent spectrum of polystyrene beads containing the florescent pigment FITC of BD 7-Color Setup Beads. FIGS. 5A and 5B are fluorescent spectrum of polystyrene beads containing the fluorescent pigment PE of BD 7-Color Setup Beads. The PMT was used as all the detectors, and application voltage was 630 V.

As shown in FIGS. 2A, 2B, 3A, 3B, 4A, 4B, 5A, and 5B, in spectrum A of the cell samples or beads measured by adjustment to the other date, an error from spectrum B is 8% or less, and it was confirmed that the spectrum with different measurement date was usable as the reference spectrum.

Potential of Detector

FIG. 6A is a graph illustrating a relationship between the potential of the detector and the florescent spectrum in which the horizontal axis is the channel number (wavelength dependent number) of the detector and the vertical axis is the fluorescent intensity, and FIG. 6B is a graph illustrating an error in each wavelength. The fluorescent spectrum shown in FIGS. 6A and 6B is data measured using the PE as the fluorescent pigment, the CD3 as the antibody, and the PMT as the detector. In the application voltage, PMTV150 is 525V, PMTV160 is 560V, PMTV170 is 595V, PMTV180 is 630V, PMTV190 is 665V, and PMTV200 is 700V.

As shown in FIGS. 6A and 6B, the error of the spectrum was 3% or less even when the potential of the detector was changed. Accordingly, it was confirmed that the fluorescent spectrum data with the different potential of the detection was usable as the reference spectrum.

Type of Coupled Antibody

Figure 7A:
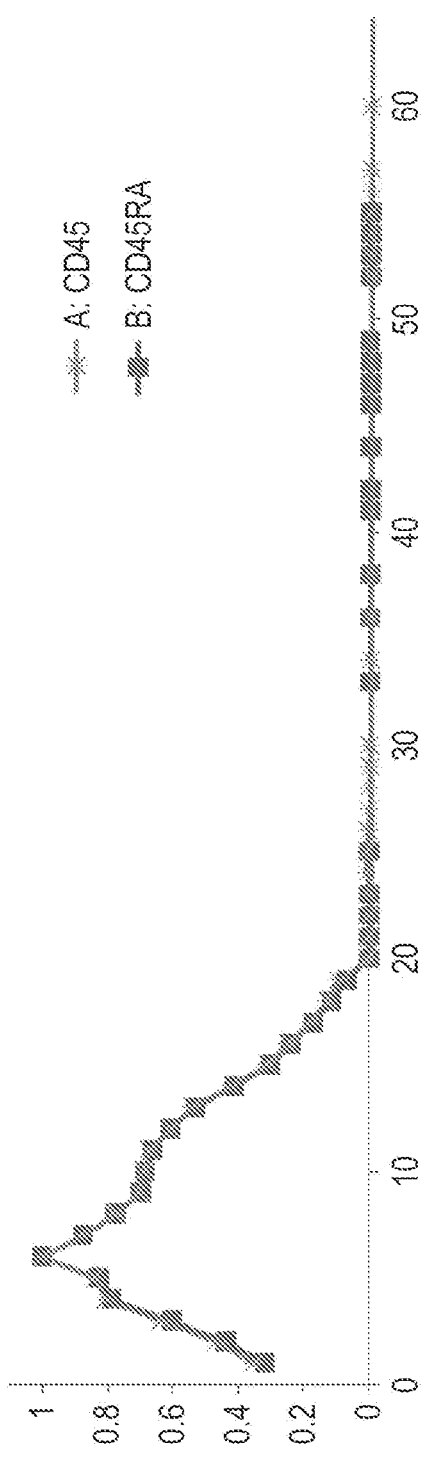
FIG. 7A is a graph illustrating a relationship between a coupled antibody and a fluorescent spectrum in which the horizontal axis is a channel number (wavelength dependent number) of a detector and the vertical axis is a fluorescent intensity.
Figure 7B:
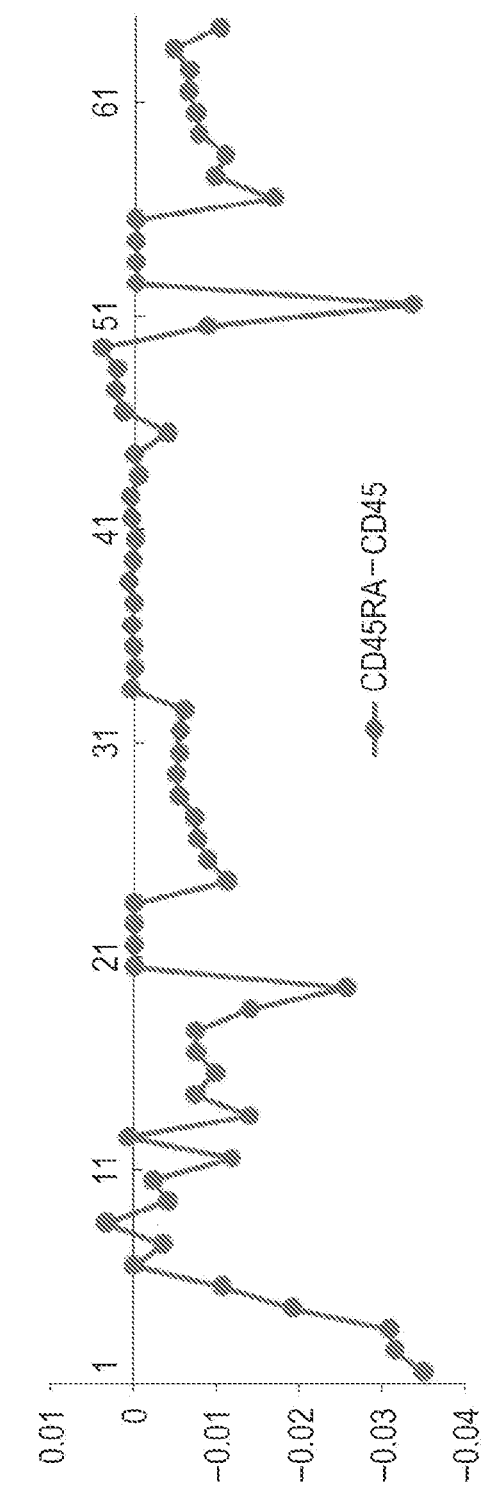
FIG. 7B is a graph illustrating an error in each wavelength (FITC: CD45 vs FITC: CD45RA).
Figure 8A:
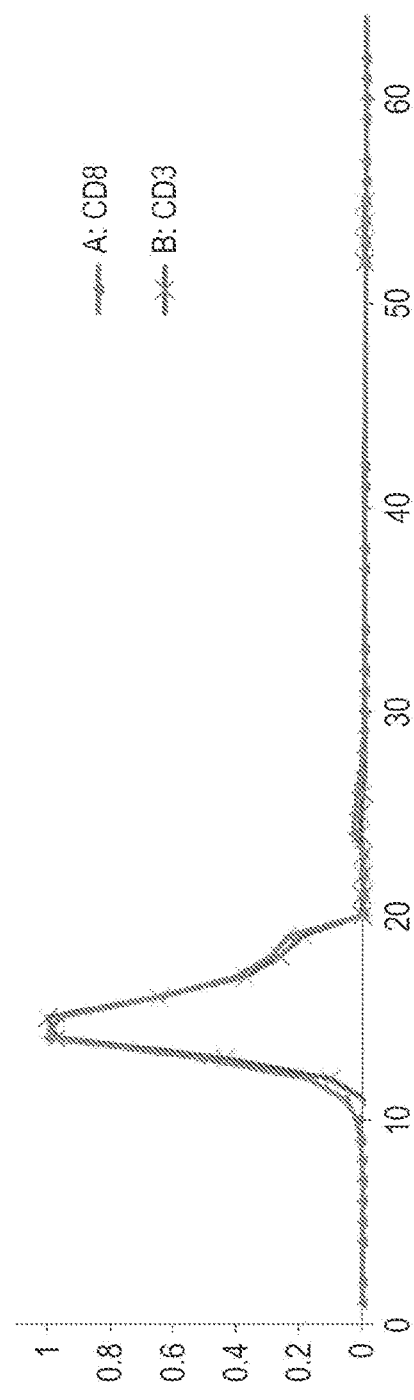
FIG. 8A is a graph illustrating a relationship between a coupled antibody and a fluorescent spectrum in which the horizontal axis is a channel number (wavelength dependent number) of a detector and the vertical axis is a fluorescent intensity.
Figure 8B:
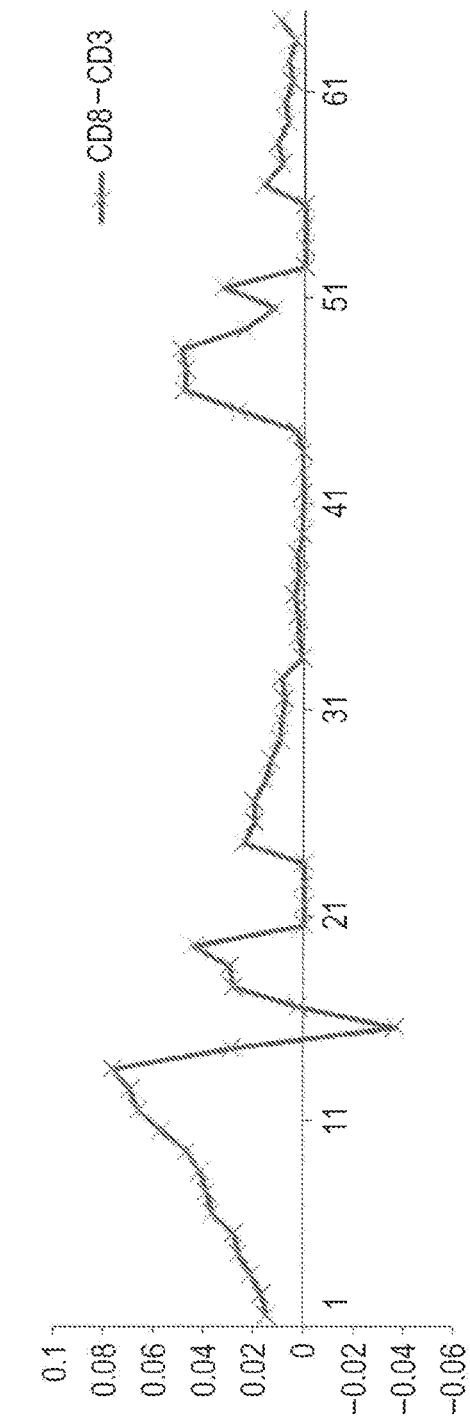
FIG. 8B is a graph illustrating an error in each wavelength (PE: CD8 vs PE: CD3).

FIGS. 7A and 8A are graphs illustrating a relationship between the coupled antibody and the fluorescent spectrum in which the horizontal axis is the channel number (wavelength dependent number) of the detector and the vertical axis is the fluorescent intensity, and FIGS. 7B and 8B are graphs illustrating an error in each wavelength. The fluorescent spectrum shown in FIGS. 7A and 7B is data measured using A: the FITC as the fluorescent pigment and the CD45 as the antibody and B: the FITC as the fluorescent pigment and the CD45RA as the antibody. The fluorescent spectrum shown in FIGS. 8A and 8B is data measured using A: the PE as the fluorescent pigment and the CD8 as the antibody and B: the FE as the fluorescent pigment and the CD3 as the antibody. The PMT was used as the detector, and all the application voltages were 525 V.

Figure 9:
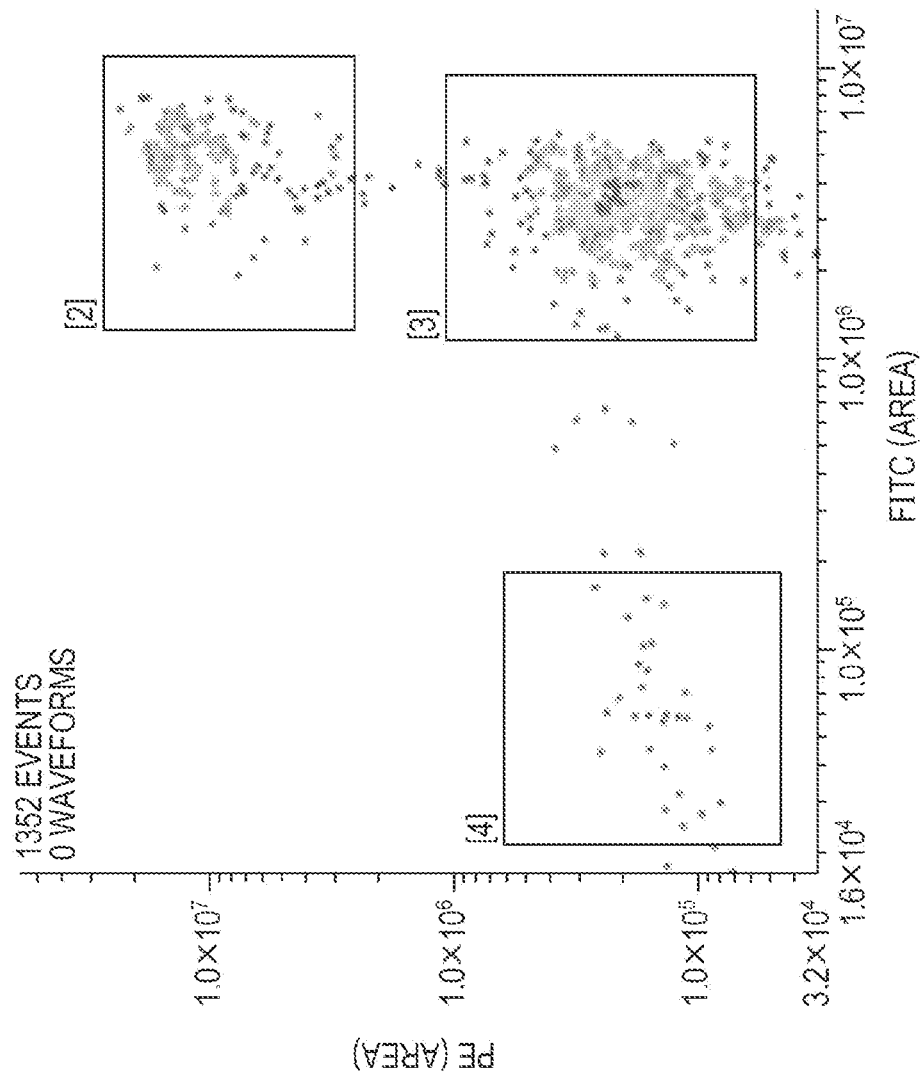
FIG. 9 is a density plot of blood cells for managing precision in which the horizontal axis is data of an antibody CD45 of a fluorescent pigment FITC and the vertical axis is data of an antibody CD8 of a fluorescent pigment PE.

The data when the FITC was used as the fluorescent pigment and the CD45 was used as the antibody, and the data when the PE was used as the fluorescent pigment and the CD8 was used as the antibody were analyzed using the reference spectrum obtained from the other set of single stain. FIG. 9 is a density plot illustrating a result thereof. As shown in FIG. 9, the analysis was performed using the reference spectrum generated by the single stain, and it could be divided into three cell groups. Each group indicates that the fluorescent correction is satisfactorily performed at an orthogonal position. The number of existence in a region throughout a gate was FITC+PE+: 278 and PICT+PE−: 750, and a ratio thereof was 0.37:1.

Then, the same analysis was performed with the data when the FITC was used as the fluorescent pigment and the CD45RA was used as the antibody, and the data when the PE was used as the fluorescent pigment and the CD3 was used as the antibody. FIG. 10 is a density plot illustrating a result thereof. As shown in FIG. 10, in the 2-dimensionally developed plot based on the FITC and PE as the fluorescent pigment, three cell groups are clearly classified, and each of them was positioned at the orthogonal position. Comparing distribution throughout the gate, the number of was FITV+PE+: 280 and PITC+PE−: 750, and the ratio thereof was 0.37:1 and was equal to the existence ratio of the data shown in FIG. 9.

From the result described above, in the independent fluorescent correcting method using the reference spectrum, as shown in FIGS. 7A, 7B, 8A, and 8B, the difference of the fluorescent spectrum is 8% or less even in the different type of coupled antibody, and it was confirmed that the spectrum was usable as the reference spectrum.

Figure 11A:
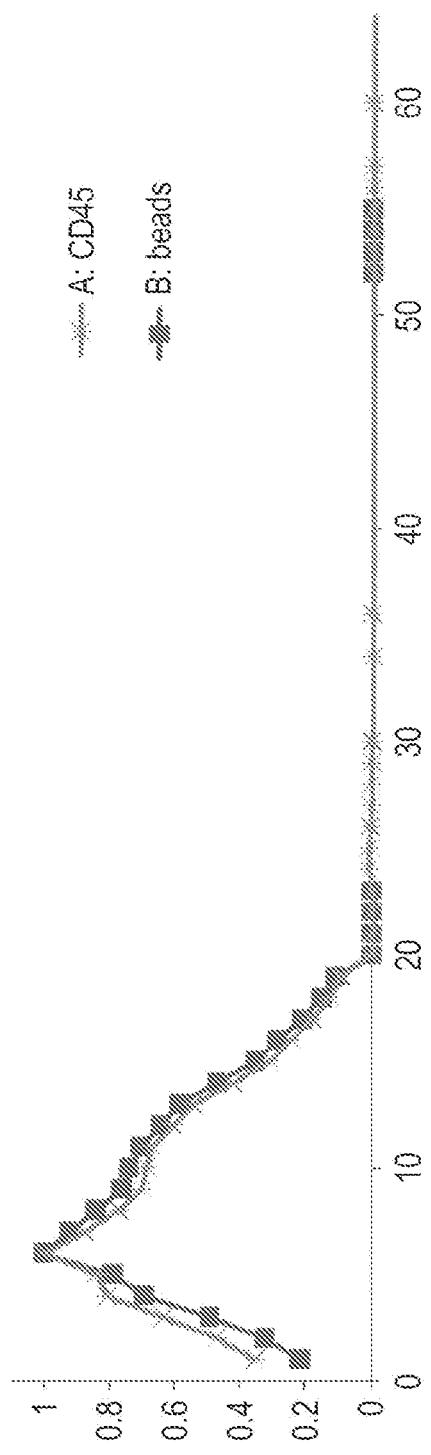
FIG. 11A is a graph illustrating a relationship between a type of micro-particle and a fluorescent spectrum in which the horizontal axis is a channel number (wavelength dependent number) of a detector and the vertical axis is a fluorescent intensity.
Figure 11B:
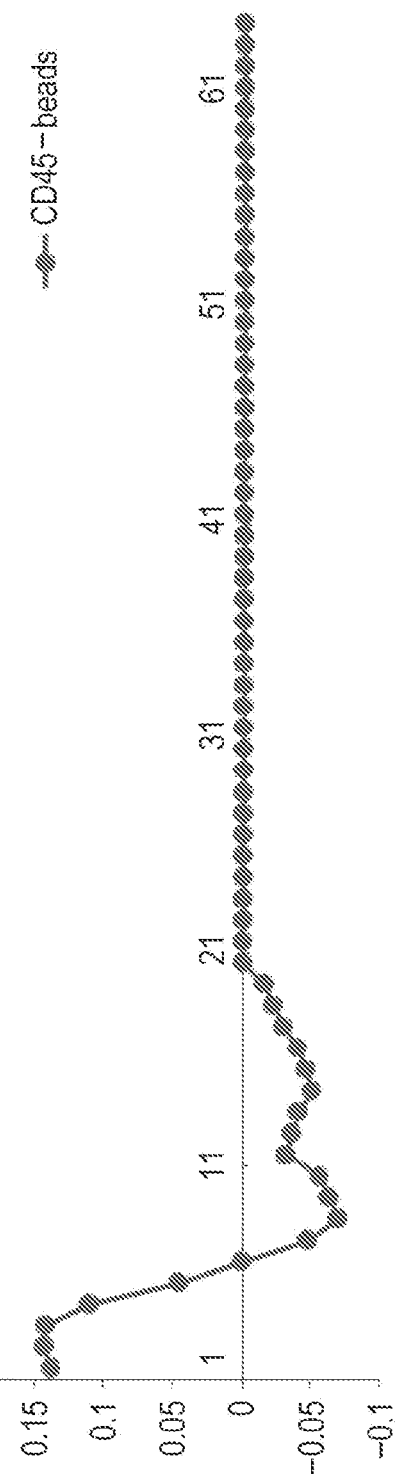
FIG. 11B is a graph illustrating an error in each wavelength.
Figure 12A:
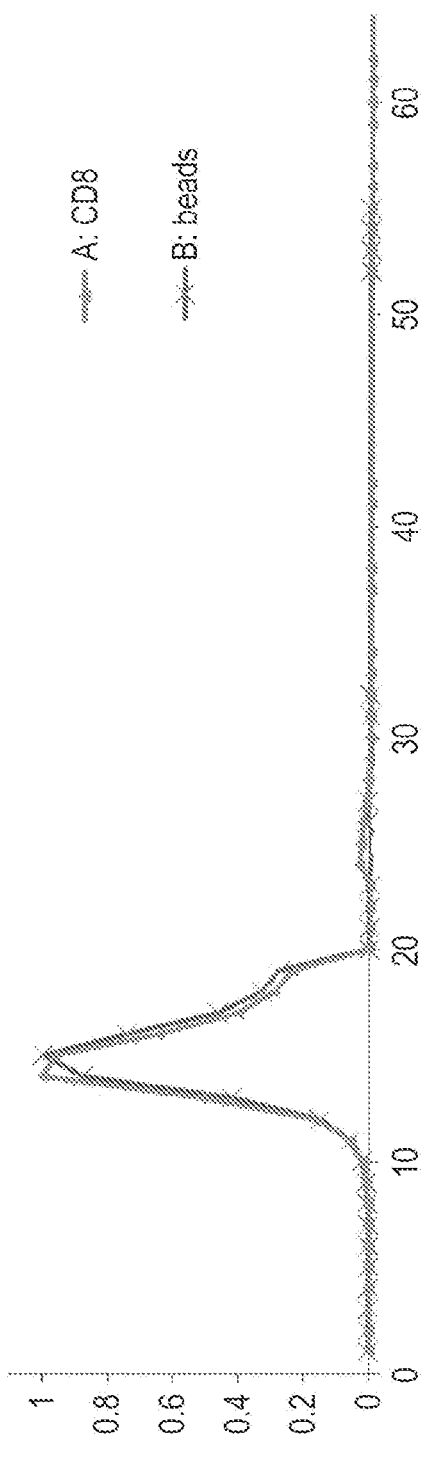
FIG. 12A is a graph illustrating a relationship between a type of micro-particle and a fluorescent spectrum in which the horizontal axis is a channel number (wavelength dependent number) of a detector and the vertical axis is a fluorescent intensity.
Figure 12B:
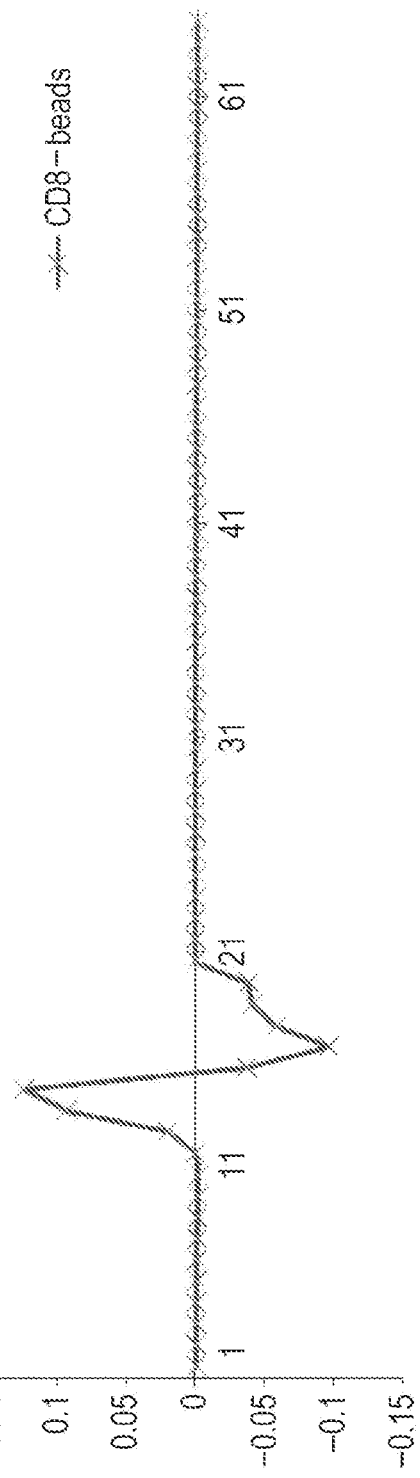
FIG. 12B is a graph illustrating an error in each wavelength.

Type of Micro-Particles FIGS. 11A and 12A are graphs illustrating a relationship between the type of the micro-particles and the fluorescent spectrum in which the horizontal axis is the channel number (wavelength dependent number) and the vertical axis is the fluorescent intensity, and FIGS. 11B and 12B are graphs illustrating an error in each wavelength. FIGS. 11A and 11B are A: fluorescent spectrum when the FITC was used as the pigment and the CD45 was used as the antibody, and B: fluorescent spectrum when polystyrene beads containing the fluorescent pigment FITC of BD 7-Color Setup Beads were used. FIGS. 12A and 12B are A: fluorescent spectrum when the PE was used as the pigment and the CD8 was used as the antibody, and B: fluorescent spectrum when polystyrene beads containing the fluorescent pigment PE of BD 7-Color Setup Beads were used. All the application voltages were 630 V.

Figure 13:
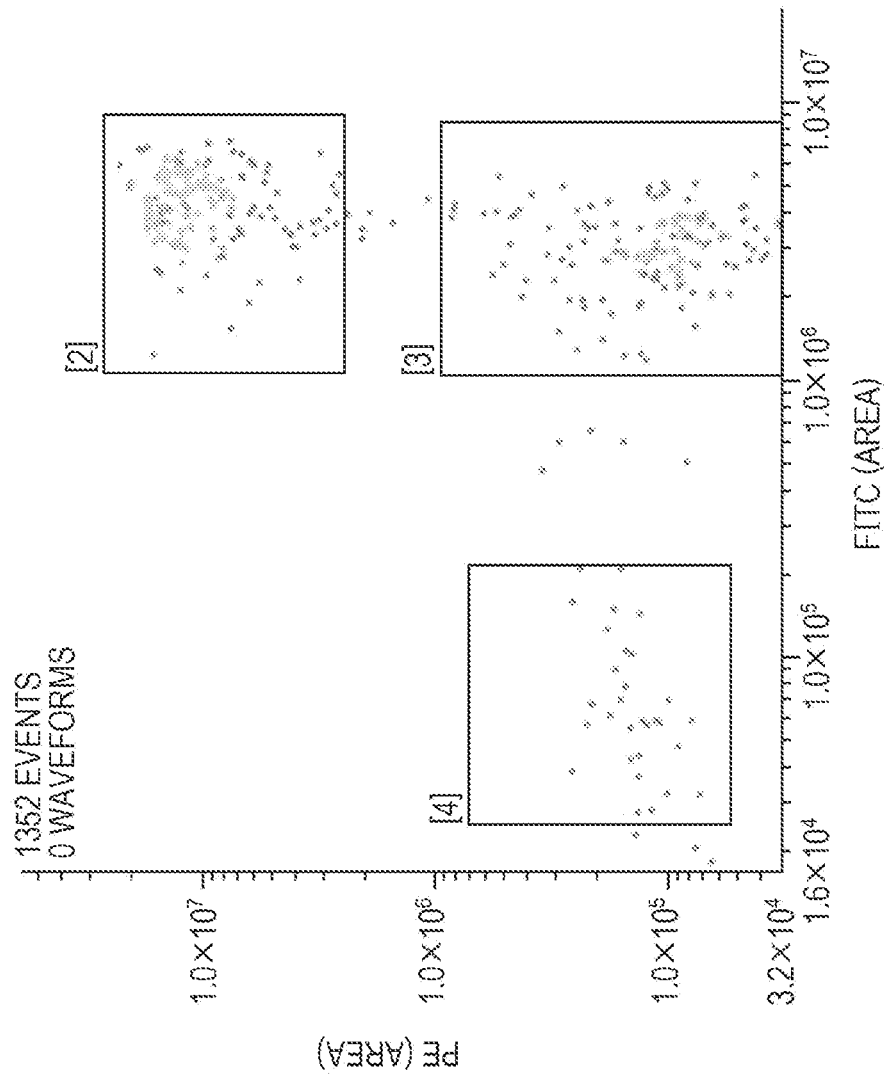
FIG. 13 is an analysis result in which the horizontal axis is data of polystyrene beads containing a fluorescent pigment FITC of BD 7-Color Setup Beads and the vertical axis is data of polystyrene beads containing a fluorescent pigment PE of BD 7-Color Setup Beads.

The data when the polystyrene beads containing the fluorescent pigment FITC of the BD 7-Color Setup Beads were used, and the data when the polystyrene beads containing the fluorescent pigment PE of the BD 7-Color Setup Beads were used were analyzed using the reference spectrum obtained from the other set of single stain. FIG. 13 is a density plot illustrating the result thereof. As shown in FIG. 13, the cell groups are classified into three, and each of them was positioned at the orthogonal position. Comparing distribution throughout the gate, the number of was FITV+PE+: 272 and PITC+PE−: 213, and the ratio thereof was 1.28:1 and was not equal to the existence ratio of the data shown in FIGS. 9 and 10.

From the result described above, in the independent fluorescent correcting method using the reference spectrum, as shown in FIG. 13, the difference of the fluorescent spectrum was over 10% even when the same pigment was used between the cells and the beads, and it was confirmed that the spectrum was usable as the reference spectrum.

As described above, according to the present disclosure, even when the single stain sample was not prepared for each probe, it was confirmed that it was possible to dissolve the overlap of each spectrum with high precision.

It should be understood by those skilled in the art that various modifications, combinations, sub-combinations and alterations may occur depending on design requirements and other factors insofar as they are within the scope of the appended claims or the equivalents thereof.

What is claimed is:

1. A fluorescent spectrum analysis system, comprising:
   a memory configured to store at least one spectrum data of a single fluorescent pigment of a plurality of fluorescent pigments previously measured under a first condition, wherein the at least one spectrum data stored in the memory is measured with a flow cytometer; and
   an analysis circuitry configured to:
   generate an analysis data for each fluorescent pigment of the plurality of fluorescent pigments based on a fluorescent spectrum from a plurality of micro-particles labeled with the plurality of fluorescent pigments under a second condition by use of the at least one spectrum data stored in the memory as a reference spectrum, wherein the flow cytometer includes a plurality of lasers configured to irradiate each of the plurality of micro-particles labeled with the plurality of fluorescent pigments; and
   generate a density plot based on the analysis data for each fluorescent pigment of the plurality of fluorescent pigments.

2. The fluorescent spectrum analysis system according to claim 1, wherein the at least one spectrum data stored in the memory is detected by a plurality of detectors in the flow cytometer.

3. The fluorescent spectrum analysis system according to claim 2, wherein the plurality of detectors comprises a plurality of multi-channel photo-multiplier tubes.

4. The fluorescent spectrum analysis system according to claim 2, wherein the plurality of detectors includes:
   at least one first detector configured to receive light excited by laser beams having wavelength of 488 nm; and
   at least one second detector configured to receive light excited by laser beams having wavelength of 640 nm.

5. The fluorescent spectrum analysis system according to claim 2, wherein
   each of the plurality of detectors includes a plurality of channels, and
   a number of the plurality of fluorescence pigments is less than a number of the plurality of channels.

6. The fluorescent spectrum analysis system according to claim 1, wherein the plurality of lasers is configured to emit laser beams having a wavelength of at least one of 488 nm or 680 nm.

7. The fluorescent spectrum analysis system according to claim 1, wherein at least one of a measurement date, a potential of a plurality of detectors, laser output, a type of coupled antibody, a type of the plurality of micro-particles, or a flux of the plurality of micro-particles of the first condition and the second condition are different from one another.

8. The fluorescent spectrum analysis system according to claim 1, wherein the plurality of fluorescent pigments includes at least one of fluorescein isothiocynate (FITC), phycoerythrin (PE), peridinin chlorophyll protein (PerCP), PE-Cy5, or PE-Cy7.

9. The fluorescent spectrum analysis system according to claim 1, wherein
the reference spectrum includes a plurality of spectrum data,
the plurality of spectrum data includes the at least one spectrum data, and
each of the plurality of spectrum data corresponds to the single fluorescent pigment of the plurality of fluorescent pigments.

10. The fluorescent spectrum analysis system according to claim 1, wherein in the reference spectrum, an error from a single stain sample is one of equal to or less than 8%.

11. A fluorescent spectrum analyzing method, comprising:
receiving at least one spectrum data of a single fluorescent pigment of a plurality of fluorescent pigments previously measured under a first condition from a memory;
irradiating, by a plurality of lasers, each of a plurality of micro-particles labeled with the plurality of fluorescent pigments labeled with the plurality of fluorescent pigments;
generating an analysis data for each fluorescent pigment of the plurality of fluorescent pigments based on a fluorescent spectrum from the plurality of micro-particles labeled with the plurality of fluorescent pigments under a second condition by using the at least one spectrum data received from the memory as a reference spectrum; and
generating a density plot based on the analysis data for each fluorescent pigment of the plurality of fluorescent pigments.

12. Fluorescent spectrum analyzing method according to claim 11, wherein in the reference spectrum, an error from a single stain sample is one of equal to or less than 8%.

13. The fluorescent spectrum analyzing method according to claim 11, wherein at least one of a measurement date, a potential of a plurality of detectors, laser output, a type of coupled antibody, a type of the plurality of micro-particles, or a flux of the plurality of micro-particles of the first condition and the second condition are different from one another.

14. The fluorescent spectrum analyzing method according to claim 11, further comprising detecting the fluorescent spectrum by a plurality of detectors in a flow cytometer.

15. The fluorescent spectrum analyzing method according to claim 14, wherein the plurality of lasers is configured to emit laser beams having a wavelength of at least one of 488 nm or 680 nm.

16. The fluorescent spectrum analyzing method according to claim 15, wherein the plurality of detectors includes:
at least one first detector configured to receive light excited by the laser beams having the wavelength of 488 nm; and
at least one second detector configured to receive light excited by the laser beams having the wavelength of 640 nm.

17. The fluorescent spectrum analyzing method according to claim 14, wherein
each of the plurality of detectors includes a plurality of channels, and
a number of the plurality of fluorescence pigments is less than a number of the plurality of channels.

18. The fluorescent spectrum analyzing method according to claim 11, wherein the plurality of fluorescent pigments includes at least one of fluorescein isothiocynate (FITC), phycoerythrin (PE), peridinin chlorophyll protein (PerCP), PE-Cy5, or PE-Cy7.

19. The fluorescent spectrum analyzing method according to claim 11, wherein
the reference spectrum includes a plurality of spectrum data,
the plurality of spectrum data includes the at least one spectrum data, and
each of the plurality of spectrum data corresponds to the single fluorescent pigment of the plurality of fluorescent pigments.

* * * * *